US012583304B2

(12) United States Patent
Lee et al.

(10) Patent No.: US 12,583,304 B2
(45) Date of Patent: Mar. 24, 2026

(54) VEHICLE BODY

(71) Applicants:HYUNDAI MOTOR COMPANY, Seoul (KR); KIA CORPORATION, Seoul (KR)

(72) Inventors: Won Hae Lee, Seoul (KR); Nam Ho Kim, Gwangmyeong-si (KR); Seung Min Jeong, Hwaseong-si (KR); Sun Keun Park, Seoul (KR); Byung Joo Chung, Gunpo-si (KR); Seung Hak Lee, Anyang-si (KR); Eun Bi Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 382 days.

(21) Appl. No.: 18/196,841

(22) Filed: May 12, 2023

(65) Prior Publication Data

US 2024/0198778 A1 Jun. 20, 2024

(30) Foreign Application Priority Data

Dec. 15, 2022 (KR) ......................... 10-2022-0176026

(51) Int. Cl.
B60K 1/04 (2019.01)
B62D 21/02 (2006.01)
(52) U.S. Cl.
CPC ................ B60K 1/04 (2013.01); B62D 21/02 (2013.01); B60K 2001/0438 (2013.01)

(58) Field of Classification Search
CPC ... B60K 1/04; B60K 2001/0438; B62D 21/02
See application file for complete search history.

(56) References Cited

U.S. PATENT DOCUMENTS

| | | | | |
|---|---|---|---|---|
| 2013/0118824 A1* | 5/2013 | Maeda | ................. | B62D 25/025 |
| | | | | 180/68.5 |
| 2018/0370570 A1* | 12/2018 | Ayukawa | ........... | B62D 25/2018 |
| 2019/0359048 A1* | 11/2019 | Tsuyuzaki | ................ | B60K 1/04 |
| 2020/0385056 A1* | 12/2020 | Kubota | .............. | B62D 25/2027 |
| 2022/0016966 A1* | 1/2022 | Kecalevic | ........... | B62D 25/025 |
| 2022/0144061 A1 | 5/2022 | Krauth | | |
| 2022/0144064 A1* | 5/2022 | Tatsuwaki | ........... | H01M 50/242 |

(Continued)

FOREIGN PATENT DOCUMENTS

| | | |
|---|---|---|
| JP | 2018203029 A | 12/2018 |
| JP | 2020104602 A | 7/2020 |

(Continued)

*Primary Examiner* — Brian L Swenson
(74) *Attorney, Agent, or Firm* — Lempia Summerfield Katz LLC

(57) ABSTRACT

A vehicle body includes: an underbody with a pair of underside members spaced apart from each other in the width direction of a vehicle and extending in the longitudinal direction of the vehicle; a battery mounted between the pair of underside members; and an upper body coupled to a top portion of the underbody to define an interior space of the vehicle. The upper body includes an upper side member protruding from each of both side ends thereof to the lower side of the vehicle, extending in the longitudinal direction of the vehicle, and laterally overlapping the outer side of the corresponding underside member.

15 Claims, 4 Drawing Sheets

(56)         References Cited

U.S. PATENT DOCUMENTS

| | | | |
|---|---|---|---|
| 2022/0227215 A1 | 7/2022 | Ishizaki et al. | |
| 2022/0242487 A1 | 8/2022 | Woo et al. | |
| 2022/0242491 A1 | 8/2022 | Woo et al. | |
| 2022/0363122 A1* | 11/2022 | Mikazuki ............. | B62D 21/157 |
| 2023/0223635 A1* | 7/2023 | Jeong ................. | H01M 50/262 |
| | | | 429/99 |
| 2024/0109408 A1* | 4/2024 | Lemura ................. | B62D 25/20 |

FOREIGN PATENT DOCUMENTS

| | | | |
|---|---|---|---|
| JP | 2020189567 A | 11/2020 |
| JP | 2021160506 A | 10/2021 |
| KR | 20220111909 A | 8/2022 |
| KR | 20220111910 A | 8/2022 |

* cited by examiner

[Cross-section B-B]           [Cross-section C-C]

VEHICLE BODY

CROSS-REFERENCE TO RELATED APPLICATION

This application is based on and claims priority under 35 U.S.C. 119 to Korean Patent Application No. 10-2022-0176026 filed on Dec. 15, 2022 in the Korean Intellectual Property Office, the disclosure of which is herein incorporated by reference in its entirety.

BACKGROUND

1. Field of the Disclosure

The present disclosure relates to a body of a vehicle.

2. Description of the Prior Art

Demand for electric vehicles driven by a battery is increasing in accordance with eco-friendly policies. An electric vehicle has a simpler structure than an engine-driven vehicle with an internal combustion engine. An electric vehicle has a battery and a driving motor mounted on a unibody platform, frame, or chassis, so the interior space of the vehicle can be customized as desired by a consumer.

The battery is mounted on the bottom of a chassis or frame in consideration of the center of gravity of the vehicle. When the battery is mounted, a battery mounting portion of the chassis or frame and a mounting flange of the battery overlap and are fastened to each other.

The above description regarding background technologies has been made only to aid in understanding the background of the present disclosure. The above description is not to be deemed by those having ordinary skill in the art to correspond to already-known prior arts.

SUMMARY

The present disclosure has been proposed to solve the above-mentioned problems. An aspect of the present disclosure is to provide a vehicle body wherein the rigidity of an underside member on a side where a battery is coupled may be increased to reduce damage to the battery caused by a side collision of a vehicle, thereby securing the stability of the battery.

In view of the foregoing aspect, a vehicle body according to the present disclosure may include: an underbody having a pair of underside members spaced apart from each other in a width direction of a vehicle and extending in a longitudinal direction of the vehicle; a battery mounted between the pair of underside members; and an upper body coupled to a top portion of the underbody to form an interior space of the vehicle. The upper body includes an upper side member protruding from each of both side ends thereof to a lower side of the vehicle, extending in the longitudinal direction of the vehicle, and laterally overlapping an outer side of a corresponding one of the underside members.

The underside members and the upper side members may be laterally spaced apart from each other. A space may be defined extending in the longitudinal direction of the vehicle between the underside member and the upper side member.

The cross-sectional areas of the underside members may vary in the longitudinal direction.

The cross-sectional area of each underside member at a point at which the battery is mounted may be smaller than the cross-sectional area of the underside member at a point at which the battery is not mounted.

A battery mounting portion of each underside member to which the battery is mounted may be configured to have a cross-sectional area decreasing as a bottom surface of the underside member is elevated. A mounting flange of the battery may be disposed beneath the elevated bottom surface of each underside member and fastened to the underside member in the vertical direction.

A first reinforcing member, configured to increase the rigidity of the respective battery mounting portion, may be provided in each battery mounting portion.

The first reinforcing member may be configured to divide the battery mounting portion in a vertical direction.

The first reinforcing member may extend in the longitudinal direction of the vehicle.

A multi-section structure, configured to increase the rigidity of the respective mounting flange of the battery, may be formed in each mounting flange.

An overlapping area of each upper side member and the respective underside member may vary in the longitudinal direction of the vehicle.

The overlapping area of each upper side member and the respective underside member may be reduced in the battery mounting portion of the underside member to which the battery is mounted.

A second reinforcing member, configured to increase the rigidity of the upper body, may be provided in the upper body.

The second reinforcing member may be configured to divide the inside of the upper body in the leftward/rightward direction.

A first reinforcing member, configured to increase the rigidity of the battery mounting portion, may be provided in the battery mounting portion. The first reinforcing member and the second reinforcing member may be provided perpendicular to each other.

A multi-section structure, configured to increase the rigidity of each upper side member, may be formed in the upper side member.

According to the vehicle body of the present disclosure, the rigidity of the underside member on a side or at a location where a battery is coupled may be increased to reduce damage to the battery caused by a side collision of a vehicle, thereby securing the stability of the battery.

BRIEF DESCRIPTION OF THE DRAWINGS

The above and other aspects, features, and advantages of the present disclosure should become more apparent from the following detailed description taken in conjunction with the accompanying drawings, in which.

DETAILED DESCRIPTION OF EMBODIMENTS

Figure 1:
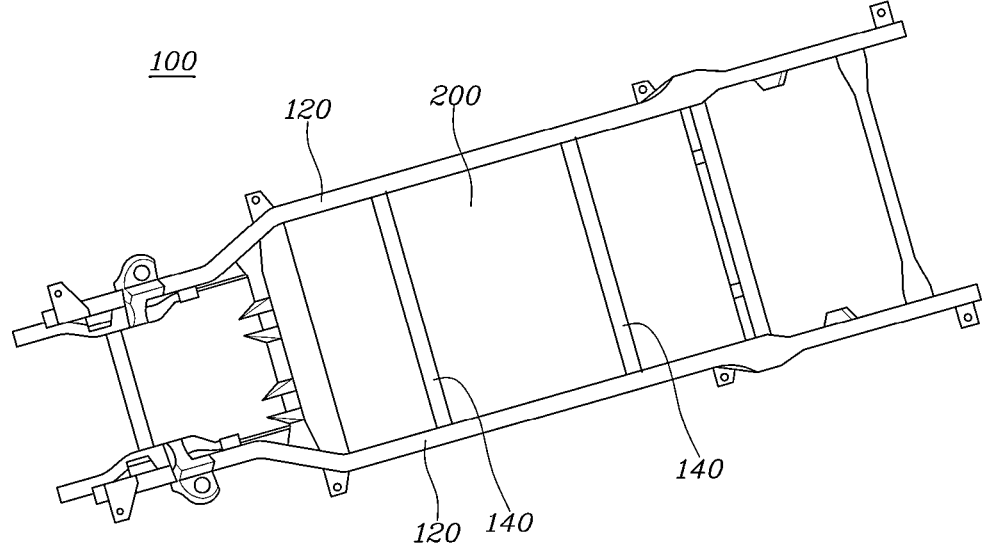
FIG. 1 is a perspective view of an underbody of a vehicle body according to an embodiment of the present disclosure.

Hereinafter, embodiments disclosed in the present specification are described in detail with reference to the accompanying drawings. The same or similar elements are given the same and similar reference numerals throughout the drawings, so duplicate descriptions thereof have been omitted.

In describing the embodiments disclosed in the present specification, where the detailed description of the relevant known technology has been determined to unnecessarily obscure the gist of the present disclosure, the detailed description thereof has been omitted. Furthermore, the accompanying drawings are provided only to aid in understanding the embodiments disclosed in the present specification. The technical spirit disclosed herein is not limited to or by the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited by the terms. The above terms are used only for the purpose of distinguishing one element from another element.

A singular expression may include a plural expression unless they are definitely different in a context.

As used herein, the expressions "include" or "have" and variations thereof are intended to specify the existence of mentioned features, numbers, steps, operations, elements, components, or combinations thereof. Such terms should be construed as not precluding the possible existence or addition of one or more other features, numbers, steps, operations, elements, components, or combinations thereof.

A vehicle body according to the present disclosure includes an underbody 100, which includes a pair of underside members 120 spaced apart from each other in the width direction of a vehicle and extending in the longitudinal direction of the vehicle. A battery 200 is mounted between the two underside members 120. An upper body 300 is coupled to the top portion of the underbody 100 to form or define the interior space of the vehicle. The upper body 300 includes an upper side member 320 that protrudes from each of both side ends of the upper body 300 to the lower side of the vehicle. Each upper side ember 320 extends in the longitudinal direction of the vehicle and laterally overlaps the outer side of a corresponding one of the underside members 120. Thus, there are two underside members 120 and two upper side members 320, as well as other related components on each side. For ease in describing embodiments, the detailed description may refer to only one of these or like components on one side of the vehicle body or may refer to both of these or like components on both sides of the vehicle body. When referring to only one side, it should be understood that the other side may have the identical construction.

Figure 2:
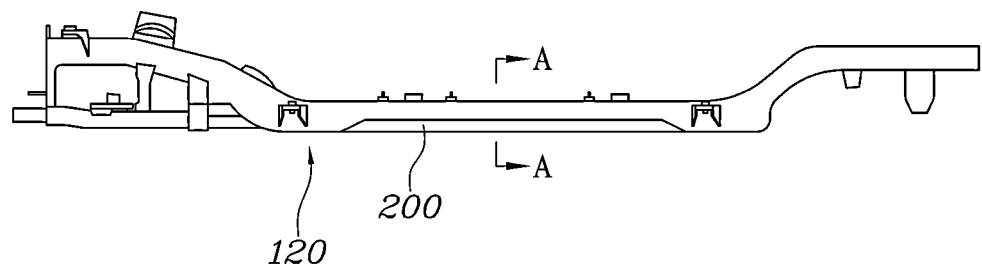
FIG. 2 is a side view of an underbody of a vehicle body according to an embodiment of the present disclosure.
Figure 3:
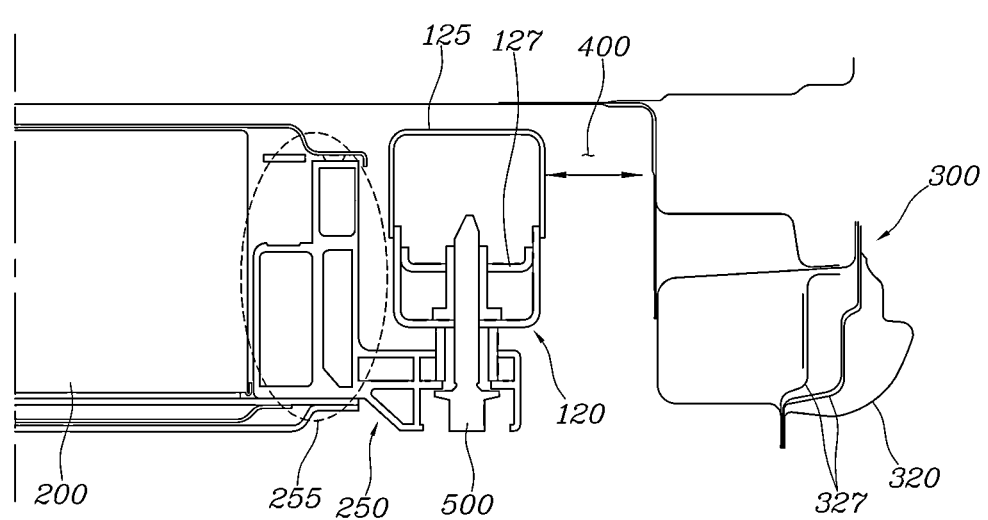
FIG. 3 is a cross-sectional view taken along A-A (including an upper body and an underbody) in FIG. 2.

FIG. 1 is a perspective view of an underbody of a vehicle body according to an embodiment of the present disclosure. FIG. 2 is a side view of an underbody of a vehicle body according to an embodiment of the present disclosure. FIG. 3 is a cross-sectional view taken along A-A (including an upper body and an underbody) in FIG. 2.

Referring to FIGS. 1-3, the vehicle body according to an embodiment of the present disclosure may be largely divided into the underbody 100 forming the lower frame or chassis of the vehicle and the upper body 300 forming or defining the interior space of the vehicle.

The underbody 100 includes the pair of underside members 120 that extend in the longitudinal direction of the vehicle and includes a cross member 140 coupled to the pair of underside members 120 in the width direction of the vehicle.

The underside members 120 and the cross member 140 are equipped with the battery 200 that provides power to a motor for driving the vehicle.

The battery 200 in one example is mounted on the underbody 100 of the vehicle to improve the center of gravity of the vehicle, the efficiency of use of the interior space of the vehicle, and the like.

The upper body 300 according to the present disclosure includes an upper side member 320 on each side that extends in the longitudinal direction of the vehicle. Each upper side member 320 is disposed adjacent the outer side of a corresponding underside member 120, and the upper side member 320 overlaps the corresponding underside member 120 in the longitudinal direction of the vehicle.

In other words, the upper side members 320 may be formed to have the same height from the ground as the corresponding underside members 120. Alternatively, the height of the upper side members 320 may be adjusted such that the upper side members 320 overlap a portion of the corresponding underside members 120.

However, the height of the upper side members 320 may be formed to be smaller than the height of the underside members 120 so that the upper side member 320 is closer to the ground than the underside member 120.

In other words, the height of the underside members 120 may be equal to or greater than the height of the upper side members 320.

In this way, when the upper side member 320 is formed to surround the underside member 120 from the outer side of the underside member 120, there is an advantage in that in the event of a side collision of the vehicle, the upper side member 320 may absorb impact energy by being deformed prior to the underside member 120. The underside member 120 to which the battery 200 is mounted is thereby protected.

The underside member 120 and the upper side member 320 may be laterally spaced apart from each other on each side of the vehicle. Thus, a lateral space 400 may be formed that extends in the longitudinal direction of the vehicle between the underside member 120 and the corresponding upper side member 320.

Specifically, referring to FIG. 3, the upper side member 320 may be formed to overlap the outer side of the underside member 120. The underside member 120 and the upper side member 320 may be spaced apart laterally from each other so that a space is formed therebetween.

When the empty space is formed in this way, a space in which the upper side member 320 can be deformed to absorb collision energy may be further provided between the upper side member 320 and the underside member 120. The stability of the battery 200 is thereby secured with the rigidity of the upper side member 320.

Figure 4:
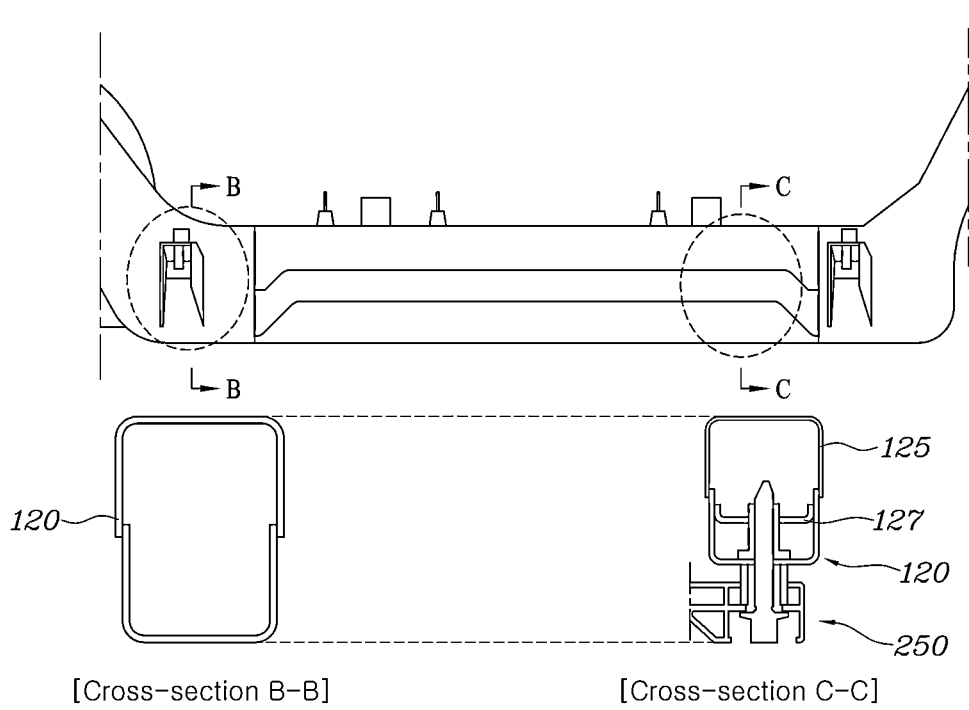
FIG. 4 illustrates a variable cross-sectional area of an underside member.

FIG. 4 illustrates a variable cross-sectional area of an underside member 120 and shows cross-sections B-B and C-C thereof.

Cross section B-B is a cross section of an underside member 120 at a side or location where the battery 200 is not mounted. Cross section C-C is a cross section of an underside member 120 at a side or location where the battery 200 is mounted.

In designing the thickness and height of the underbody 100, one should consider the height of the underbody 100, which enables a passenger to easily board the vehicle. One should also consider the height of the underbody 100 that prevents the battery 200 mounted on the underbody 100 from being damaged by obstacles on the ground (e.g., stones or foreign objects under the vehicle).

For easy boarding of a passenger, it is advantageous to reduce the height of the underbody 100. However, in order to protect the battery 200, it is advantageous to increase the height of the underbody 100.

These conditions may contradict each other, so it is necessary to properly configure the height of the underbody 100.

Accordingly, the height of the underbody 100 is configured to allow a passenger to easily board, but the thickness of the underside member 120 to which the battery 200 is mounted is configured to be smaller than the thickness of the underside member 120 to which the battery 200 is not mounted. Therefore, when the battery 200 is mounted, the battery 200 may be protected from external obstacles.

In other words, the cross-sectional areas of the underside members 120 may vary in the longitudinal direction. The cross-sectional area of each underside member 120 at a point at which the battery 200 is mounted may be smaller than the cross-sectional area of the underside member 120 at a point at which the battery 200 is not mounted.

Accordingly, the overlapping area of the upper side member 320 and the underside member 120 may vary in the longitudinal direction of the vehicle. The overlapping area of the upper side member 320 and the underside member 120 may be reduced in a battery mounting portion 125 of the underside member 120 to which the battery 200 is mounted.

The battery mounting portion 125 of the underside member 120 to which the battery is mounted has a cross-sectional area decreasing as the bottom surface of the underside member 120 is elevated. A mounting flange 250 of the battery 200 may be disposed beneath the elevated bottom surface of each underside member 120 and fastened to the respective underside member 120 in the vertical direction.

Specifically, referring to FIGS. 2-4, the battery mounting portion 125 of the underside member 120 and the mounting flange 250 of the battery 200 overlap each other in the vertical direction. A fastening portion 500 may be inserted into the battery mounting portion 125 and the mounting flange 250 so as to mount the battery 200 to the underside member 120.

The mounting flange 250 is disposed on the bottom of the underside member 120. Thus, the fastening portion 500 first extends through the mounting flange 250 to mount the battery 200 to the underside member 120.

A first reinforcing member 127, configured to increase the rigidity of the battery mounting portion 125, may be provided in the battery mounting portion 125.

Specifically, referring to FIGS. 3 and 4, the first reinforcing member 127 is provided in the battery mounting portion 125 of the underside member 120. The first reinforcing member 127 may be provided at or along all of the underside member 120 or may be provided only in the battery mounting portion 125.

Like the underside member 120, the first reinforcing member 127 extends in the longitudinal direction of the vehicle to increase the rigidity of the battery mounting portion 125.

The first reinforcing member 127 may support the fastening part 500 by applying pressure to the fastening part 500 from the leftward/rightward direction of the fastening part 500 penetrating the battery mounting portion 125 from the bottom, so that the fastening part 500 is not separated from the battery mounting portion 125 by vibration during the traveling of the vehicle.

In addition, the first reinforcing member 127 may divide the battery mounting portion 125 in the vertical direction.

In other words, the first reinforcing member 127 may protect the battery 200 from external side impact by dividing the inside of the battery mounting portion 125 in the vertical direction while supporting the fastening part 500.

A multi-section structure 255, configured to increase the rigidity of the mounting flange 250, may be formed in the mounting flange 250 of the battery 200.

Specifically, the multi-section structure 255 may include empty spaces and cross-sections having four or more angles. The multi-section structure 255 may be formed in the mounting flange 250. When the inside of the mounting flange 250 is formed as the multi-section structure 255, it is possible to withstand external side collisions occurring at various angles. The rigidity of the mounting flange 250 itself may be greatly increased by adopting the multi-section structure 255 including an empty space having a vertically or horizontally long width.

A second reinforcing member 327, configured to increase the rigidity of the upper body 300, may be provided in the upper body 300. A multi-section structure 255, configured to increase the rigidity of the upper side member 320, may be formed in the upper side member 320.

Specifically, referring to FIG. 3, the second reinforcing member 327 is provided on the upper side member 320. The second reinforcing member 327 may be provided at or along all of the upper side member 320 or may be provided only at or along a part of the upper side member 320.

The second reinforcing member 327, like the upper side member 320, may extend in the longitudinal direction of the vehicle to increase the rigidity of the upper side member 320.

In addition, the rigidity of the upper body 300 may be enhanced by forming the inside of the upper side member 320 in a multi-section structure (not shown).

The first reinforcing member 127, configured to increase the rigidity of the battery mounting portion 125, may be provided in the battery mounting portion 125. The first reinforcing member 127 and the second reinforcing member 327 may be provided perpendicular to each other.

For example, the second reinforcing member 327 may divide the inside of the upper body 300 in the leftward/rightward direction. The first reinforcing member 127 may divide the inside of the battery mounting portion 125 in the vertical direction.

The first reinforcing member 127 and the second reinforcing member 327 may divide the space of the battery mounting portion 125 and the space of the upper body 300 in different directions, respectively. The overall rigidity of the vehicle body and capability to withstand and respond to a side collision of the vehicle may thereby be increased.

Although the present disclosure has been described and illustrated in conjunction with particular embodiments thereof, it should be apparent to those having ordinary skill in the art that various improvements and modifications may be made to the embodiments of the present disclosure without departing from the technical idea of the present disclosure defined by the appended claims.

What is claimed is:

1. A vehicle body comprising:

an underbody having a pair of underside members spaced apart from each other in a width direction of a vehicle and extending in a longitudinal direction of the vehicle;

a battery mounted between the pair of underside members; and an upper body coupled to a top portion of the underbody to define an interior space of the vehicle, wherein the upper body includes two lateral side portions and an upper side member protruding downward from each of the two lateral side portions of the upper body toward a lower side of the vehicle, extending in the longitudinal direction of the vehicle, and laterally overlapping an outer side of a corresponding underside member.

2. The vehicle body of claim 1, wherein the underside member and the upper side member are laterally spaced apart from each other, and wherein a space is defined extending in the longitudinal direction of the vehicle between the underside member and the upper side member.

3. The vehicle body of claim 1, wherein cross-sectional areas of the underside members vary in the longitudinal direction.

4. The vehicle body of claim 3, wherein the cross-sectional area of each underside member at a point at which the battery is mounted is smaller than the cross-sectional area of each underside member at a point at which the battery is not mounted.

5. The vehicle body of claim 1, wherein a battery mounting portion of each underside member to which the battery is mounted is configured to have a cross-sectional area decreasing as a bottom surface of the underside member is elevated, and wherein a mounting flange of the battery is disposed beneath the elevated bottom surface of each underside member and fastened to the corresponding underside member in the vertical direction.

6. The vehicle body of claim 5, wherein a first reinforcing member is provided in each battery mounting portion and is configured to increase rigidity of the corresponding battery mounting portion.

7. The vehicle body of claim 6, wherein each first reinforcing member is configured to divide the corresponding battery mounting portion in a vertical direction.

8. The vehicle body of claim 6, wherein each first reinforcing member extends in the longitudinal direction of the vehicle.

9. The vehicle body of claim 5, wherein a multi-section structure of each mounting flange is configured to increase rigidity of each mounting flange of the battery.

10. The vehicle body of claim 1, wherein an overlapping area of each upper side member and each underside member varies in the longitudinal direction of the vehicle.

11. The vehicle body of claim 10, wherein the overlapping area of each upper side member and each underside member is reduced in the battery mounting portion of each underside member to which the battery is mounted.

12. The vehicle body of claim 1, wherein a second reinforcing member is provided in the upper body and is configured to increase rigidity of the upper body.

13. The vehicle body of claim 12, wherein the second reinforcing member is configured to divide the inside of the upper body in a leftward/rightward direction.

14. The vehicle body of claim 12, wherein a first reinforcing member is provided in each battery mounting portion and is configured to increase the rigidity of the corresponding battery mounting portion, and herein each first reinforcing member and the second reinforcing member are provided perpendicular to each other.

15. The vehicle body of claim 1, wherein a multi-section structure is provided in each upper side member and is configured to increase rigidity of the corresponding upper side member.

* * * * *